Feb. 23, 1960 K. L. BELL 2,926,282

VACUUM TUBE AND ELECTRIC SIGNALLING APPARATUS

Original Filed March 3, 1950

INVENTOR.
KEITH L. BELL
BY
Allen and Chromy
HIS ATTORNEYS

United States Patent Office 2,926,282

Patented Feb. 23, 1960

2,926,282

VACUUM TUBE AND ELECTRIC SIGNALLING APPARATUS

Keith Lansing Bell, Washington, D.C., assignor of five percent to Robert J. Patch and Susanne S. Patch, Chevy Chase, Md., fifty percent to Ben J. Chromy, Washington, D.C., and fifteen percent to Herbert J. A. Runsdorf and H. Norman Runsdorf, both of Brooklyn, N.Y.

Original application March 3, 1950, Serial No. 147,532, now Patent No. 2,817,785, dated December 24, 1957. Divided and this application September 13, 1956, Serial No. 609,771

5 Claims. (Cl. 315—10)

My invention relates to electron discharge devices in general. More specifically this invention relates to an electron discharge device which may be used as a television camera that is responsive to light of different colors or frequencies and is self scanning for proper image resolution.

This application is a division of my application Serial No. 147,532, filed March 3, 1950, now Patent No. 2,817,785, issued on December 24, 1957.

An object of this invention is to provide an improved electron discharge device that may be employed as a television camera, an oscillation generator or a frequency multiplier.

Another object of my invention is to provide a television image transmitting camera which is self scanning, self rastering or self image dissecting.

Another object of my invention is to provide an improved type of television image transmitting camera which may be either panchromatic or monochromatic in its response to light of different colors or frequencies dependent upon the photo electric materials employed and acts to release groups, pulses or waves of electrons from a light sensitive electron emissive element adapted to modulate a radio frequency carrier wave of usual type or adapted to be impressed upon other carrier means.

Another object of my invention is to provide a television image transmitting camera that transmits action scenes with frames per second frequency so low that the signal may be efficiently transmitted over conventional telephone cables or wires or world wide on the radio waves of relatively long wavelengths.

A further object of my invention is to provide a self scanning camera capable of transmitting by television on a low frequency carrier of, for example, 300 kc. from one to thirty or more complete pictures or frames per second.

Still a further object of my invention is to provide a self scanning television camera that employs noninterlacing electron waves impinging against an angularly tilted collector, the tilted collector, target or anode.

Still another object of my invention is to provide a self image dissecting television camera which transmits picture or image signals together with sound signals.

A still further object of my invention is to provide a television camera which will instantaneously and continuously transmit complete self scanned or self dissected pictures or frames of an image formed by lights of different colors and intensities on the light sensitive electron emissive cathode at very high speed.

Still another object of my invention is to provide a magnetic field positioned in such angular relationship to the electrons which are released at different energies from the light sensitive electron emissive cathode of the television camera by light of different intensities, colors or frequencies impinging upon the light sensitive cathode, that the released electrons then travel between the cathode and the electron collector, target or anode in curved paths depending upon their energies.

Another object of this invention is to provide a frequency multiplier employing an electron discharge device with an electron collector positioned askew with respect to the cathode and provided with a discontinuous electron collecting surface that is connected to provide multiplied pulses in an output circuit.

Still another object of this invention is to provide a frequency multiplier employing an electron discharge device that is connected to generate electrical oscillations and at the same time multiplies the frequency of those oscillations on the order of a thousand times.

A further object of this invention is to provide an electron discharge device having a flat electron emitting cathode and a cone shaped electron collecting electrode provided with a spiral shaped electrically conducting surface.

Another object of this invention is to provide an electron discharge device having flat electron emitting cathode and a trapezoidal electron collecting electrode positioned askew with respect to the plane of the cathode.

Other and further objects and applications of my invention will be readily apparent to those skilled in the art and are to be considered within the scope of my invention and my appended claims.

Referring to the drawings briefly:

Figure 1:
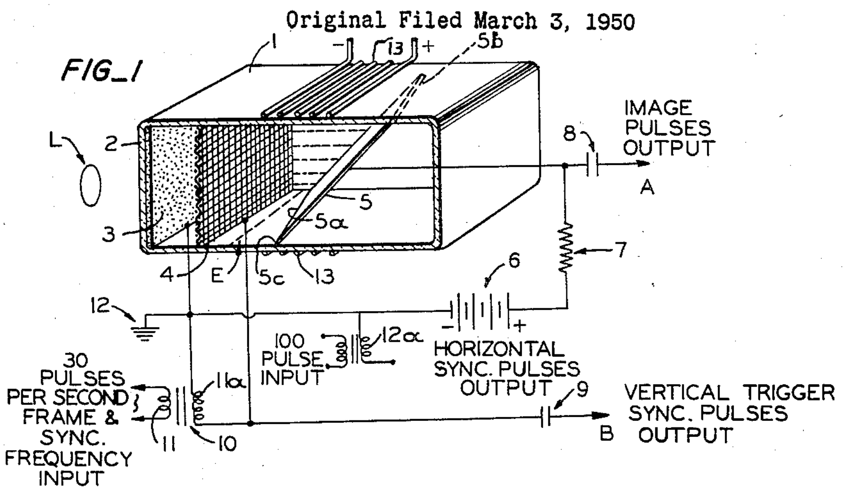
Fig. 1 is a cross sectional view of and embodiment of this invention employing a target electrode positioned askew with respect to the plane of the cathode.

Referring to Fig. 1 of the drawing in detail. Reference numeral 1 designates a transparent glass or other suitable envelope enclosing a plurality of electrodes in the evacuated space or vacuum thereof. The transparent frontal face 2 of envelope 1 is arranged to support a light sensitive electron emissive layer 3 which is supported by a transparent electrically conductive layer. The layer 3 may be composed of different kinds of light sensitive salts of elements, such as potassium, sodium and cesium to form a composite photoelectric cathode having a panchromatic response to light of different colors. This light sensitive elemental layer 3 is deposited upon or attached to the transparent electrically conductive layer which may be annealed stannous chloride or a thin layer of gold or silver deposited on a plastic sheet such as "Markite" by cathode sputtering, evaporation in a vacuum or other well known processes for applying very thin metallic coatings.

A wire mesh screen 4 is employed as a control grid and the mesh or interstices per square inch of this grid determines the number of picture elements which can be transmitted per frame. For example, a 100 mesh or interstice per linear inch screen or grid 4 may be used to produce 10,000 mesh or interstices per square inch thereby producing a picture of 10,000 elements per square inch comparable in detail to a 100 mesh screen half tone newsprint.

The electrically conductive target electrode 5, which may be a thin metal plate is employed as an electron collector, target or anode and is permanently positioned in an specific dual angular relationship in the vertical and horizontal planes with respect to the cathode 3, which is provided with either a panchromatic of a monochromatic light sensitive electron emissive surface. The electrode 4 which is an electrically conductive wire screen of very fine mesh, on the order of 10,000 mesh per square inch, is positioned parallel to the electron emissive cathode 3. It is of course obvious that different mesh screens for different degrees of picture detail may be used as desired in order to control the waves of electrons passed on to the tilted collector 5.

A transformer 10, having primary and secondary coils 11 and 11*a* wound in inductively coupled relation, is connected to a source of alternating current providing the frame and synchronizing frequency. One side of the secondary coil 11*a* is connected to photoelectric cathode 3, to ground 12, to one side of the pulse transformer secondary 12*a* and to the negative terminal of the anode battery 6; and the other side of this secondary 11*a* is connected to the control electrode 4 and is coupled by the capacitor 9 to the output B.

In the arrangement of this device shown in Figs. 1, 2, 3 and 4 no two points of the electrode 5 are the same distance away from the cathode 3 because of the angular position of this electrode with respect to the cathode 3. The bottom edge 5*a* of the electrode 5 is positioned at a 45 degree or other suitable angle with respect to the bottom edge of the cathode 3 and the edge 5*b* is inclined at a greater angle with respect to the top edge of the cathode. The plane of the collector electrode 5 forms a trapezoidal figure no two points of which are the same distance from the electron emitting plane of the cathode 3. Therefore, when a cloud E of electrons representing an image to be transmitted by television, is released by light from the cathode 3 and this electron cloud is gated through the control electrode 4 by a positve electrical pulse from an external source being momentarily impressed on electrode 4 the electron cloud from cathode 3 will pass through the control electrode 4 at uniform velocity. Thus all the electrons of the electron cloud from member 3 move towards collector 5 at substantially the same velocity and in the same vertical plane in respect to each other, therefore the electron cloud will strike the collector 5 at the point 5*b* nearest to the cathode 3 first and henceforth will continue to strike the progressively further points of the collector 5 consecutively and progressively until the entire surface of collector 5 has collected the electron cloud constituting a complete electron image from the cathode 3 characteristic of and corresponding to the visible light image focussed thereon.

It is to be noted that metal plate electron collecting anode 5 must be perfectly flat to 1/10,000 of an inch and smooth on the side facing cathode 3 and control grid 4 and is positioned at a minute oblique horizontal angle calibrated to very close tolerances. The progressively increasing oblique horizontal angle of anode 5 and the progressively increasing vertical angle are so calibrated that no more than one specific point of the electron cloud E representing the image from photo cathode 3 triggered by the positive pulse applied to the grid 4 with respect to the cathode 3, can strike more than one specific point of anode 5 at a given instant. The electrons of this cloud must strike the anode 5 in a consecutive horizontal linear order progressively from one side to the other and rising vertically from bottom to top of anode 5 until the total area of the flat side of anode 5 facing toward photo cathode 3 has been completely covered or scanned by the electron cloud from photo cathode 3 which represents the image to be transmitted by television.

Figure 2:
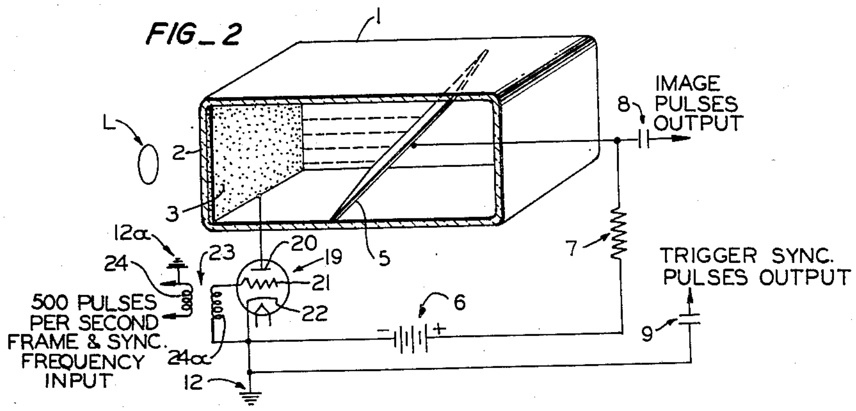
Fig. 2 is a modified form of this invention shown in Fig. 1 in which the control grid has been eliminated.

In Fig. 2 there is shown a modified form of this invention in which the grid 4 has been eliminated from the tube 1. The tube in this form of the invention is also provided with a cathode 3 at the front end 2 of the tube and a lens L is employed for focussing an image on this light sensitive cathode through the end 2 of the tube 1 the same as in the embodiments of this invention shown in Figs. 1 and 4. The tube 1 shown in Fig. 2 is also provided with an anode 5 which is of trapezoidal shape the same as the anode shown in Fig. 1 and the electrons emitted by the cathode 3 are focussed upon the anode 5 by the focussing coil 13 which is connected to a source of current supply (not shown).

It is possible to dispense with the control grid 4 shown in Fig. 1, in the form of this invention shown in Fig. 2, by providing a pulsing or triggering tube 19 having an anode 20, connected to the cathode 3, a control grid 21 connected to the secondary 24*a* of the input transformer 23 and also having a cathode 22 connected to the lower end of the secondary 24*a*. This cathode 22 is also connected to ground 12 and to the negative terminal of the anode battery 6, the positive terminal of which is connected to the anode 5 and to the resistor 7. The output circuit carrying the image pulses is coupled to the anode 5 by the capacitor 8 and the output circuit carrying the trigger pulses for carrying the synchronizing pulses to be transmitted to the receiver is connected to the cathode of the tube 19 by the capacitor 9. It is obvious that these latter pulses may be obtained from the anode 20 of the tube 19, if desired.

The pulses controlling the tube 19 are applied to the input of this tube through the transformer 23 and for this purpose a suitable pulse generating circuit such as a multivibrator may be connected to the primary 24. On the other hand the input of the tube 19 may be coupled directly or through a suitable capacitor to the output of a pulse generator of any desirable and conventional design. Thus the internal impedance of the tube 19 is periodically reduced at the frequency of the pulses applied to this tube and pulses or clouds of electrons are periodically caused to pass between the cathode 3 and the anode 5. These pulses or clouds of electrons are collected on the anode 5 and produce a pulse of much longer duration than the duration of the initial triggering pulse. However, the initial energy or potential applied to the electrons to cause them to move toward the anode 5 is furnished by the pulse applied between the cathode 3 and the anode 5 by the operation of the tube 19. If desired, a suitable high resistance may be connected from the anode 20 of the tube 19 to the anode 5 of the tube 1 and the potential drop across this resistor due to the pulse transmitted through the tube 19 may be employed to trigger the tube 1. Furthermore, the tube 19 may be a gas tube of the thyratron type and in that case the resistor connected between the anode 20 and the anode 5 and the resistor 7 may be so proportional as to function as a quenching resistor for the gas tube 19.

Figures 3, 4:
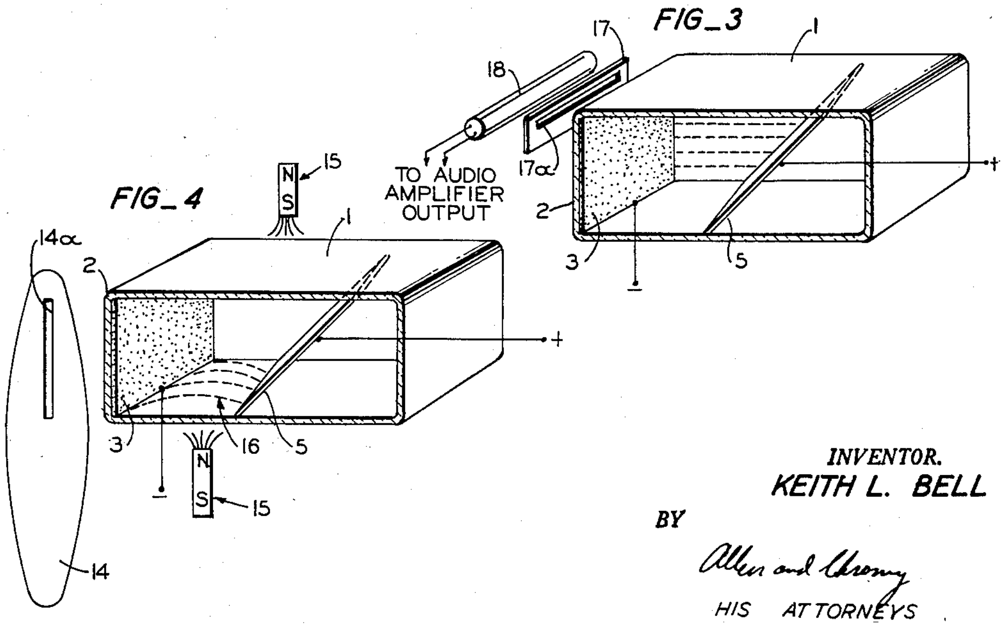
Fig. 3 is a view of another embodiment of this invention.
Fig. 4 is a view of a further embodiment of this invention.

In Fig. 3 there is shown a modification of this invention in which the upper part of the cathode 3 is exposed to light from a tube or lamp 18 which is modulated in accordance with sound waves or in accordance with other signals of varying amplitude. The tube 18 is of elongated shape and is provided with a pair of electrodes positioned in parallel relation and extending substantially throughout the length of the tube. Thus voltages modulated in accordance with sound waves or other amplitude modulated signals will cause the gas in the tube 18 to be ionized different degrees along the length of this tube, starting at the left hand end and proceeding to the right hand end. In this way a relatively low voltage signal will ionize the gas at the left hand end of the tube only whereas a relatively high voltage signal will ionize the gas throughout the length of the tube. The light from the ionized gas passes to the cathode 3 through the slot 17*a* formed in the mask 17 or through a suitable lens and electron emission is produced on the part of the cathode 3 that is thus activated. A picture image may be projected on the lower part of the cathode 3 or other modulated signal derived from a series of tubes such as tube 18 may be used to energize the balance of the cathode 3. This embodiment is employed for the simultaneous transmission of single channel sight and sound. Obviously the television receiver employed for receiving the simultaneous sight and sound transmitted by the embodiment of Fig. 3 would require a photo electric cell positioned at a point on the face of the receiving picture kinescope in exact registration where the flashing light image of gaseous glow tube 18 would appear and this photo cell is connected to a suitable amplifier and the output thereof connected to a suitable audio transducer.

In Fig. 4 there is shown another embodiment of this invention in which the tube 1 is provided with an electron emissive cathode 3 that is supported on the front 2 of the tube. The target electrode 5 is similar to the target electrode shown in Figs. 1, 2 and 3 except that in this case this electrode may be tilted at a greater angle and may, in fact, lie flat on the bottom side of the tube. However, the front edge *5a* of this electrode is positioned at an angle with respect to the plane of the cathode 3. In addition to the electron focussing winding 13, similar to the winding 13 shown in Fig. 1, the tube 1 shown in Fig. 4 is provided with a pair of permanent magnets or solenoids 15 which are of such size and oriented so that the paths 16 of the electrons emitted by the cathode 3 are curved to hit the corresponding areas of the target 5.

A thin disc 14 that is opaque to light and is provided with a narrow sloted aperture *14a* is employed as a rotary focal plane shutter to control the number of complete pictures of frames transmitted per second depending upon the revolutions of this disc. This disc may be driven by any suitable means, as shown. In addition to the slot *14a* two more slots may be provided to this disc and these slots may be disposed at angles of 120 degrees from each other. Furthermore, the different slots may be provided with different color filters, that is, one slot may carry a red filter, the second slot may carry a green filter and the third slot may carry a blue filter and these may be employed for synchronized sequential transmission of television images in natural color.

When employing a control grid 4, shown in Fig. 1, of 10,000 mesh per square inch and pulsing it positive 30 times a second for 30 complete frames or pictures per second of 10,000 elements per square inch for each frame or picture it will be seen that $10,000 \times 30 = 300,000$ pulses per second assuming a total one square inch of photo cathode 3 were illuminated by light of different intensity, therefore, it is obvious that to employ my invention pictures in detail comparable to a 100 mesh half tone print could be dissected, self scanned and transmitted by television on a 300 kilocycle channel making possible direct world wide television completely eliminating horizon to horizon line of sight barriers, co-axial cable and radio relays as conventional present day television now demands and employs for distance transmission.

The camera of this invention may be used to advantage in guided missile television where lightness, compactness and economy is demanded and offers beyond the horizon television transmission on low frequencies.

While this invention has been disclosed in detail with respect to certain preferred embodiments, it is, of course, understood that it is not desired to limit this invention to the exact details shown and described except in so far as those details are defined by the appended claims.

I claim as follows:

1. Television apparatus comprising a tube having a photo sensitive cathode, means for projecting an image on said cathode, a target electrode having a trapezoidally shaped conductive surface, means for simultaneously projecting pulses from all of the elemental areas of said cathode toward corresponding areas of said target electrode, said pulses being modulated in accordance with said image, means for fixedly orienting said cathode and said target electrode with respect to each other so that the lengths of the paths between said elemental areas and corresponding areas of said target electrode are all different and means for connecting an output circuit to said target electrode for carrying current pulses corresponding to said modulated pulses.

2. Electric signalling apparatus comprising a tube having a photo sensitive cathode, means for projecting an image on said cathode, a target electrode having a trapezoidally shaped conductive surface, means for fixedly positioning said cathode and said target electrode with respect to each other so that corresponding elemental areas thereof are different distances apart, a control electrode positioned between said cathode and said target electrode, a voltage pulse generator connected between said cathode and said control electrode for controlling the flow of electrons between said cathode and said target electrode, means for focussing the electrons from said cathode upon corresponding elemental areas of said target electrode, and an output circuit connected between said cathode and said target electrode.

3. Television apparatus comprising a tube having a photosensitive cathode, means for projecting an image on said cathode, a target electrode having a trapezoidally shaped conductive surface, means for projecting electrons from said cathode to said target electrode in substantially straight paths, means for fixedly positioning said cathode and said target electrode with respect to each other so that the length of the electron paths from elemental areas of said cathode to said target electrode are all different, a control electrode positioned between said cathode and said target electrode, said second mentioned means comprising a voltage pulse generator connected between said cathode and said control electrode for controlling the flow of electrons between said cathode and said target electrode, said second mentioned means further comprising means for focussing the electrons from said cathode upon corresponding elemental areas of said target electrode, and an output circuit connected between said cathode and said target electrode.

4. Electric signalling apparatus comprising a tube having a substantially flat electron emissive cathode, means for projecting an image on said cathode, a target electrode, means for fixedly positioning said cathode and said target electrode in inclined position with respect to each other at a predetermined angle, a voltage pulse producing generator having an output circuit connected to apply voltage pulses between said cathode and said target electrode, each of said voltage pulses having a time duration on the order of a fraction of a micro-second, and an output circuit connected to said target electrode for deriving pulses therefrom having a substantially greater time duration than that of said first mentioned pulses and being amplitude modulated in accordance with the light and dark shades of said image.

5. Television apparatus comprising a tube having a light sensitive cathode of substantially flat configuration, a target electrode having a trapezoidally shaped conductive surface, means for fixedly positioning said cathode and said target electrode with respect to each other so that no parts of said cathode and said target electrode are parallel, means for producing clouds of electrons traveling from said cathode to said target electrode, said last mentioned means including means for spacing said clouds, as they are emitted from said cathode so that the electrons from one cloud are completely collected by said target electrode when the electrons from the next cloud start to impinge upon said target electrode, and an output circuit connected to said target electrode for deriving pulses having a duration substantially equal to the duration of said clouds, as they are emitted from said cathode plus the spacing therebetween.

References Cited in the file of this patent

UNITED STATES PATENTS

| | | |
|---|---|---|
| 2,227,018 | Schlesinger | Dec. 31, 1940 |
| 2,227,097 | Lubszynski | Dec. 31, 1940 |
| 2,256,462 | Iams | Sept. 16, 1941 |
| 2,307,209 | George | Jan. 5, 1943 |
| 2,437,418 | Cawein | Mar. 9, 1948 |
| 2,817,785 | Bell | Dec. 24, 1957 |

FOREIGN PATENTS

| | | |
|---|---|---|
| 406,368 | Great Britain | Feb. 26, 1934 |